(12) United States Patent
Stieger

(10) Patent No.: US 9,079,634 B2
(45) Date of Patent: Jul. 14, 2015

(54) BICYCLE HAVING AN ELECTRICAL AUILIARY DRIVE

(71) Applicant: Interholz Handelsgesellschaft m.b.H., Pasching (AT)

(72) Inventor: Ewald Stieger, Pasching (AT)

(73) Assignee: Interholz Handelsgesellschaft m.b.H., Pasching (AT)

( * ) Notice: Subject to any disclaimer, the term of this patent is extended or adjusted under 35 U.S.C. 154(b) by 0 days.

(21) Appl. No.: 14/178,424

(22) Filed: Feb. 12, 2014

(65) Prior Publication Data

US 2014/0231163 A1 Aug. 21, 2014

(30) Foreign Application Priority Data

Feb. 19, 2013 (AT) ................. A 50112/2013

(51) Int. Cl.
*B60K 1/00* (2006.01)
*B62M 6/55* (2010.01)
*B62M 6/40* (2010.01)
*B62M 6/65* (2010.01)

(52) U.S. Cl.
CPC . *B62M 6/55* (2013.01); *B62M 6/40* (2013.01); *B62M 6/65* (2013.01)

(58) Field of Classification Search
CPC ............ B62M 6/20; B62M 6/40; B62M 6/45; B62M 6/55; B62M 6/65

USPC ...................... 180/206.4, 206.5, 206.6, 206.7
See application file for complete search history.

(56) References Cited

U.S. PATENT DOCUMENTS

| 3,884,317 | A | * | 5/1975 | Kinzel ........................... 180/220 |
| 4,280,581 | A | * | 7/1981 | Rudwick .................... 180/206.5 |
| 7,261,175 | B1 | * | 8/2007 | Fahrner ..................... 180/206.4 |
| 7,661,501 | B1 | * | 2/2010 | Perdue ........................... 180/210 |
| 2003/0141126 | A1 | * | 7/2003 | Hays et al. .................... 180/207 |
| 2005/0039963 | A1 | * | 2/2005 | Forderhase ................... 180/205 |
| 2005/0067207 | A1 | | 3/2005 | Radtke et al. |
| 2005/0189157 | A1 | * | 9/2005 | Hays et al. .................... 180/207 |
| 2008/0121452 | A1 | * | 5/2008 | Bon .............................. 180/205 |
| 2010/0181130 | A1 | * | 7/2010 | Chou ............................. 180/206 |
| 2011/0056756 | A1 | * | 3/2011 | Murad ........................ 180/65.31 |
| 2011/0139530 | A1 | * | 6/2011 | Ananthakrishna ......... 180/206.5 |
| 2013/0032425 | A1 | * | 2/2013 | Lee et al. ...................... 180/220 |

* cited by examiner

*Primary Examiner* — Tony Winner
(74) *Attorney, Agent, or Firm* — Collard & Roe, P.C.

(57) ABSTRACT

A bicycle having a pedal crank drive (12) and having an electrical auxiliary drive, which is connected to the pedal crank drive (12), is described, which has a wheel hub motor (7) having a freewheel hub for the rear wheel (6). To provide advantageous drive conditions, it is proposed that the wheel hub motor (7) for the rear wheel (6) have a drive connection via a transmission gearing (8) to an electrical auxiliary motor (9) of identical size.

4 Claims, 1 Drawing Sheet

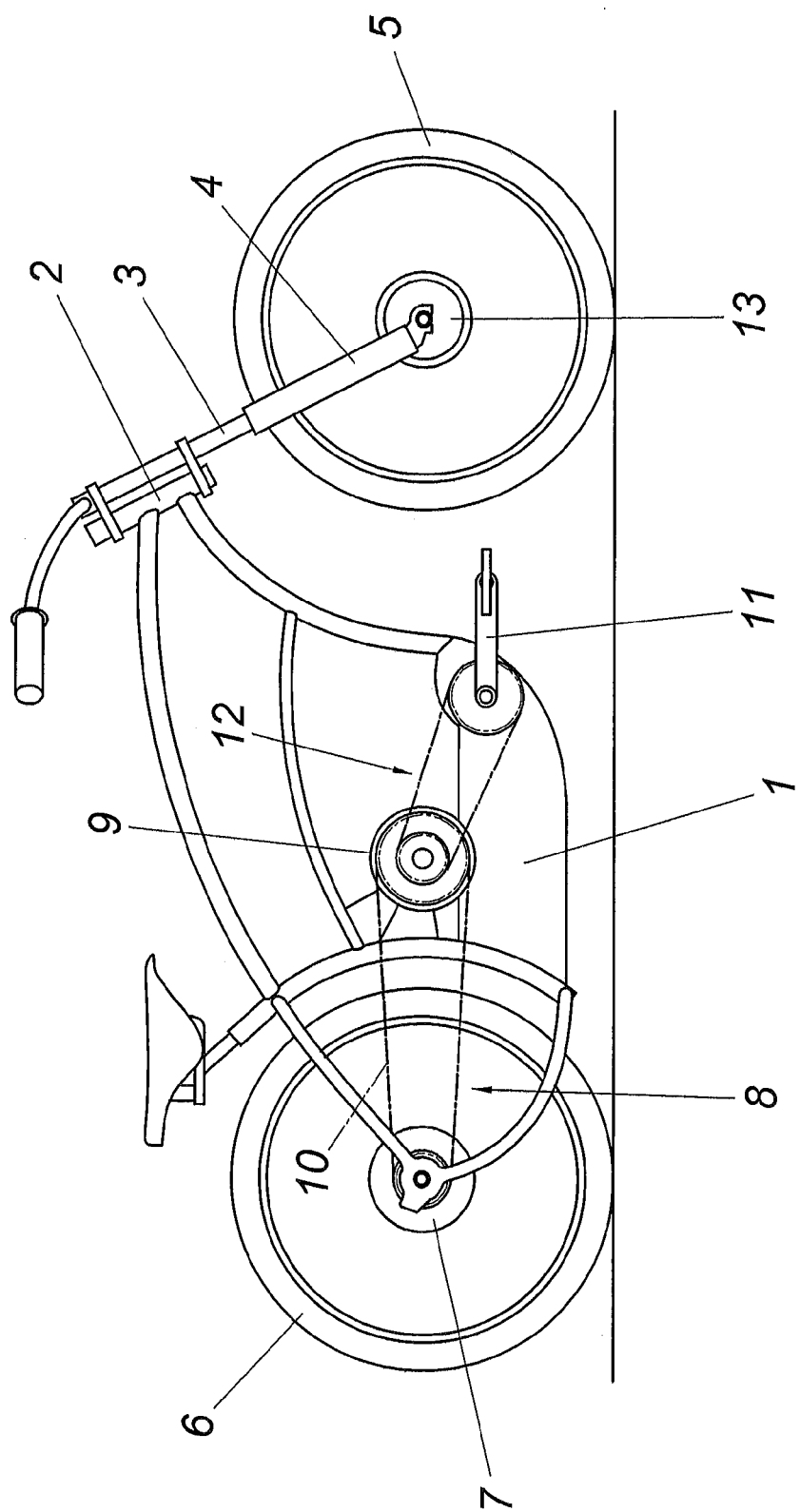

BICYCLE HAVING AN ELECTRICAL AUILIARY DRIVE

CROSS REFERENCE TO RELATED APPLICATIONS

Applicant claims priority under 35 U.S.C. §119 of Austrian Application No. A50112/2013 filed on Feb. 19, 2013, the disclosure of which is incorporated by reference.

BACKGROUND OF THE INVENTION

1. Field of the Invention

The invention relates to a bicycle having a pedal crank drive and having an electrical auxiliary drive, which is connected to the pedal crank drive, and which has a wheel hub motor having a freewheel hub for the rear wheel.

2. Description of the Related Art

To provide advantageous design conditions for electrical auxiliary drives in bicycles, providing a wheel hub motor for the rear wheel, whose spokes engage directly on the wheel hub motor, is known. The pedal crank drive is connected to the freewheel hub of this wheel hub motor, wherein typically a shift transmission is interposed, to be able to provide an advantageous pedaling frequency range for a comparatively large speed range for the pedal crank. This means, if a gear shifter is provided, that a bicycle user must operate the gear shifter accordingly to be able to predefine advantageous operating conditions with respect to the pedal crank drive. These difficulties can be avoided by an automatic transmission, but an automatic transmission also cannot take influence on the operating point of the wheel hub motor resulting due to the motor load as a result of the travel resistance.

In addition, providing the front wheel of a bicycle with an electrical auxiliary drive is known (US 2005/067207 A1), wherein the possibility exists of also providing the rear wheel with an identical auxiliary drive. These auxiliary drives can be equipped with step-down transmissions which can be switched over, to allow an extensive adaptation of the auxiliary drives to the respective requirements. However, the design expenditure is substantially increased by the additional step-down transmissions.

SUMMARY OF THE INVENTION

The invention is therefore based on the object of implementing an electrical auxiliary drive for a bicycle such that, on the one hand, a pedaling frequency for the pedal crank drive can be maintained in a predefined range and, on the other hand, an automatic adaptation of the auxiliary drive to the respective travel conditions can be achieved.

Proceeding from a bicycle of the type described at the beginning, the invention achieves the stated object in that the wheel hub motor for the rear wheel has a drive connection via a transmission gearing to an electrical auxiliary motor of equal size.

Due to the rigid drive connection between the wheel hub motor and the auxiliary motor at a predefined transmission ratio, it is ensured that the two motors are operated in different operating ranges. This means in the case of the typical speed-torque characteristic curve for the wheel hub motors used, in which the speed decreases with increasing torque, that one of the two motors, as a result of the transmission ratio, is operated at an operating point corresponding to the lower speed and the other motor is operated at an operating point corresponding to the higher speed, with the effect that as a result of the transmission, the motor operated at the lower speed is used in particular at higher travel velocities, while the motor which is operated at higher speeds comes into effect at lower travel velocities, when the speed of the motor operated at lower speeds already sinks below an amount which makes stable motor operation difficult. Due to the two motors of the electrical auxiliary drive, which are to have identical size, i.e., identical power, but do not have to have identical structural form, an elastic, electrical axle is more or less provided, which allows a high-performance travel operation without an additional shift transmission. It must only be ensured that a sufficiently large transmission ratio is provided to be able to use corresponding different operating points for the two motors. The allocation of the required drive power to two motors of identical size additionally provides the advantage that smaller sizes of these motors can be used.

The transmission gearing can be implemented as a gearwheel gearing. However, simpler design conditions result if the transmission gearing is implemented as a revolving traction drive, so that chain drives or toothed belt drives, which are proven for this purpose, can be used. If a transmission ratio between the speed of the wheel hub motor for the rear wheel and the speed of the auxiliary motor greater than 1 is provided for the transmission gearing, i.e., if the wheel hub motor for the rear wheel is operated at a higher speed, the bicycle can be driven at a higher velocity via the electrical auxiliary drive. The pedal crank drive engages on the freewheel hub of the auxiliary motor in this case.

BRIEF DESCRIPTION OF THE DRAWINGS

The subject matter of the invention is shown as an example in the drawing, specifically a bicycle according to the invention is shown in a schematic side view.

DETAILED DESCRIPTION OF THE PREFERRED EMBODIMENTS

The bicycle shown has a frame 1 having a mount 2 for a steering column 3, which carries a mounting fork 4 for a front wheel 5. The rear wheel 6, which is mounted in the frame 1, is provided with a wheel hub motor 7, on which the spokes of the rear wheel 6 engage, which is not shown for reasons of comprehensibility, however. The wheel hub motor 7 is connected via a transmission gearing 8 to an auxiliary motor 9 of identical size, which is supported on the frame 1, wherein the transmission gearing 8, which is implemented as a revolving traction drive 10 having a chain or a toothed belt as the traction means, engages on the freewheel hub of the wheel hub motor 7. The pedal crank 11 of the pedal crank drive 12, which is mounted in the frame 1, has a drive connection to the freewheel hub of the auxiliary motor 9 via a revolving traction means. However, it is also possible to assign the auxiliary motor 9 to the pedal crank mount, so that a revolving traction means between the pedal crank drive 12 and the freewheel hub of the auxiliary motor 9 for the drive connection can be omitted and the pedal crank shaft extends coaxially to the motor shaft.

Since, according to the illustrated exemplary embodiment, the wheel hub motor 7 is operated at a higher speed than the auxiliary motor 9 as a result of the selected transmission ratio of the transmission gearing 8, at slow travel velocities, the high torques of the wheel hub motor 7 can be used at sufficiently high speeds for a stable drive, which could no longer ensure the drive stability in the range of the auxiliary motor 9 under certain circumstances. At higher travel velocities, the higher torques of the auxiliary motor 9, which is operated at a lower speed, is then used for the electrical auxiliary drive.

The requirement for this purpose is a sufficiently large transmission ratio. For example, a transmission ratio of 1:2 has proven to be advantageous.

The electrical auxiliary drive can be assisted in a conventional manner by the pedal crank drive 12. For this purpose, the pedal crank drive 12 is to be connected to the freewheel hub of the motor, which is operated at a lower speed. The pedal crank drive 12 is to be designed having a corresponding transmission ratio for this purpose.

It probably does not have to be described in greater detail that the front wheel 5 can also be driven via a wheel hub motor 13, as is indicated in the drawing. In this case, an all-wheel-driven bicycle is achieved, which, in the event of corresponding activation of the wheel hub motor 13 for the front wheel 5, has particularly good travel properties, without having to provide a shift transmission.

The invention claimed is:

1. A bicycle having a pedal crank drive and an electrical auxiliary drive, said auxiliary drive including an electrical auxiliary motor which is connected to the pedal crank drive; and a wheel hub motor having a freewheel hub for the rear wheel, wherein the wheel hub motor has a drive connection via a transmission gearing to the electrical auxiliary motor, and wherein the wheel hub motor is of identical size as the electrical auxiliary motor.

2. The bicycle according to claim 1, wherein the transmission gearing is implemented as a revolving traction drive.

3. The bicycle according to claim 1, wherein the transmission gearing has a transmission ratio between the speed of the wheel hub motor for the rear wheel and the speed of the auxiliary motor greater than 1.

4. The bicycle according to claim 3, wherein the pedal crank drive has a drive connection via a freewheel hub to the auxiliary motor.

* * * * *